United States Patent
Mehta et al.

(10) Patent No.: US 9,992,113 B2
(45) Date of Patent: Jun. 5, 2018

(54) VIRTUAL NETWORK INTERFACE CONTROLLER PERFORMANCE USING PHYSICAL NETWORK INTERFACE CONTROLLER RECEIVE SIDE SCALING OFFLOADS

(71) Applicant: VMware, Inc., Palo Alto, CA (US)

(72) Inventors: Rishi Mehta, San Jose, CA (US); Lenin Singaravelu, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 199 days.

(21) Appl. No.: 14/755,674

(22) Filed: Jun. 30, 2015

(65) Prior Publication Data
US 2017/0005931 A1    Jan. 5, 2017

(51) Int. Cl.
*H04L 12/743*  (2013.01)
*H04L 12/861*  (2013.01)
(Continued)

(52) U.S. Cl.
CPC .......... *H04L 45/7453* (2013.01); *H04L 49/90* (2013.01); *G06F 9/455* (2013.01); *G06F 9/526* (2013.01); *H04L 67/1097* (2013.01)

(58) Field of Classification Search
CPC ....... H04L 45/38; H04L 45/74; H04L 45/742; H04L 45/7543; H04L 49/35; H04L 49/90;
(Continued)

(56) References Cited

U.S. PATENT DOCUMENTS 7,660,306 B1 *  2/2010  Eiriksson ............ H04L 12/4641
                                                370/392
7,664,110 B1 *  2/2010  Lovett ................... H04L 49/351
                                                370/392

(Continued)

OTHER PUBLICATIONS

Emmerich P, Raumer D, Wohlfart F, Carle G. Performance characteristics of virtual switching. InCloud Networking (CloudNet), 2014 IEEE 3rd International Conference on Oct. 8, 2014 (pp. 120-125). IEEE.*

(Continued)

*Primary Examiner* — Ranodhi Serrao
*Assistant Examiner* — James Fiorillo
(74) *Attorney, Agent, or Firm* — Patterson & Sheridan LLP

(57) ABSTRACT

Techniques disclosed herein provide an approach for using receive side scaling (RSS) offloads from a physical network interface controller (PNIC) to improve the performance of a virtual network interface controller (VNIC). In one embodiment, the PNIC is configured to write hash values it computes for RSS purposes to packets themselves. The VNIC then reads the hash values from the packets and places the packets into VNIC RSS queues, which are processed by respective CPUs, based on the hash values. CPU overhead is thereby reduced, as RSS processing by the VNIC no longer requires computing hash values. In another embodiment in which the number of PNIC RSS queues and VNIC RSS queues are identical, the VNIC may map packets from PNIC RSS queues to VNIC RSS queues using the PNIC RSS queue ID numbers, which also does not require the computing RSS hash values.

17 Claims, 5 Drawing Sheets

(51) Int. Cl.
*H04L 29/08* (2006.01)
*G06F 9/455* (2018.01)
*G06F 9/52* (2006.01)

(58) Field of Classification Search
CPC ..... H04L 49/9063; H04L 45/75; H04L 49/00; H04L 49/351; H04L 67/1097; G06F 9/455; G06F 9/526
USPC ........ 709/219, 226; 370/389, 392, 401, 412; 710/310; 718/1
See application file for complete search history.

(56) References Cited

U.S. PATENT DOCUMENTS

| | | | |
|---|---|---|---|
| 7,782,869 B1* | 8/2010 | Chitlur Srinivasa | G06F 9/5011 370/230 |
| 9,426,095 B2* | 8/2016 | Pandey | H04L 49/00 |
| 9,459,904 B2* | 10/2016 | Mehta | G06F 9/45558 |
| 2007/0115982 A1* | 5/2007 | Pope | H04L 45/742 370/392 |
| 2007/0217409 A1* | 9/2007 | Mann | H04L 63/029 370/389 |
| 2008/0040519 A1* | 2/2008 | Starr | H04L 49/90 710/39 |
| 2008/0235690 A1* | 9/2008 | Ang | G06F 9/526 718/102 |
| 2010/0014526 A1* | 1/2010 | Chavan | H04L 12/467 370/395.53 |
| 2010/0312941 A1* | 12/2010 | Aloni | H04L 49/90 710/310 |
| 2010/0333101 A1* | 12/2010 | Pope | H04L 47/10 718/103 |
| 2012/0079478 A1* | 3/2012 | Galles | H04L 47/10 718/1 |
| 2012/0131578 A1* | 5/2012 | Ciano | G06F 9/45558 718/1 |
| 2012/0155256 A1* | 6/2012 | Pope | G06F 13/128 370/230 |
| 2013/0042003 A1* | 2/2013 | Franco | H04L 67/1097 709/226 |
| 2013/0060940 A1* | 3/2013 | Koponen | H04L 12/4633 709/225 |
| 2013/0336320 A1* | 12/2013 | Rangaraman | H04L 45/38 370/392 |
| 2014/0254594 A1* | 9/2014 | Gasparakis | H04L 45/74 370/392 |
| 2015/0046922 A1* | 2/2015 | Allen | G06F 9/45558 718/1 |
| 2015/0055468 A1 | 2/2015 | Agarwal et al. | |
| 2015/0326475 A1* | 11/2015 | CJ | H04L 61/103 370/392 |
| 2016/0072766 A1* | 3/2016 | Jain | H04L 61/2567 709/228 |
| 2016/0241482 A1* | 8/2016 | Tsuruoka | H04L 47/621 |

OTHER PUBLICATIONS

Dong Y, Xu D, Zhang Y, Liao G. Optimizing network I/O virtualization with efficient interrupt coalescing and virtual receive side scaling. InCluster Computing (Cluster), 2011 IEEE International Conference on Sep. 26, 2011 (pp. 26-34). IEEE.*

Liao G, Znu X, Bnuyan L. A new server I/O architecture for high speed networks. InHigh Performance Computer Architecture (HPCA), 2011 IEEE 17th International Symposium on Feb. 12, 2011 (pp. 255-265). IEEE.*

U.S. Appl. No. 14/530,587, filed Oct. 31, 2014.

* cited by examiner

VIRTUAL NETWORK INTERFACE CONTROLLER PERFORMANCE USING PHYSICAL NETWORK INTERFACE CONTROLLER RECEIVE SIDE SCALING OFFLOADS

BACKGROUND

In a virtualized environment, virtual network interface controllers (VNICs) are instantiated in a virtualization layer (also referred to herein as the "hypervisor") supporting virtual machines (VMs) and are programmed to behave similarly to physical NICs (PNICs). One feature both PNICs and VNICs have supported is receive side scaling (RSS), which involves computing a hash of incoming packet header attributes and distributing the incoming network traffic across CPUs for processing based on the computed hash values. Packets belonging to the same connection are distributed to the same RSS queue, based on the computed hash value, for processing by a particular CPU. For VNICs in particular, RSS is traditionally handled by the hypervisor, and the RSS processing causes CPU overhead.

SUMMARY

One embodiment provides a computer-implemented method of delivering packets from queues of a physical network interface controller (PNIC) to queues of a virtual network interface controller (VNIC). The method generally includes storing received packets in the PNIC queues based on hash values computed by the PNIC from header attributes of the received packets. The method further includes forwarding the packets stored in the PNIC queues to the VNIC queues based on the hash values computed by the PNIC if the number of PNIC queues is different from the number of VNIC queues.

Further embodiments include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide techniques for using receive side scaling (RSS) offloads from a physical network interface controller (PNIC) to improve the performance of a virtual network interface controller (VNIC). In one embodiment, the PNIC is configured to write hash values it computes for RSS purposes to packets themselves. The VNIC then reads the hash values from the packets and forwards the packets to VNIC RSS queues, which are processed by respective CPUs, based on the hash values. Doing so reduces CPU overhead, as the RSS processing by the hypervisor no longer requires computing hash values. In another embodiment in which the number of PNIC RSS queues and VNIC RSS queues is identical, the VNIC may map packets from PNIC RSS queues to VNIC RSS queues using the PNIC RSS queue ID numbers, which also does not require the hypervisor to compute hash values. In yet another embodiment, each VNIC RSS queue has a respective lock that can be separately acquired to access the queue, in contrast to traditional techniques in which a single lock was used for all VNIC RSS queues, and the packet list from a PNIC RSS queue is split into multiple packet lists that are separately delivered to respective VNICs.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
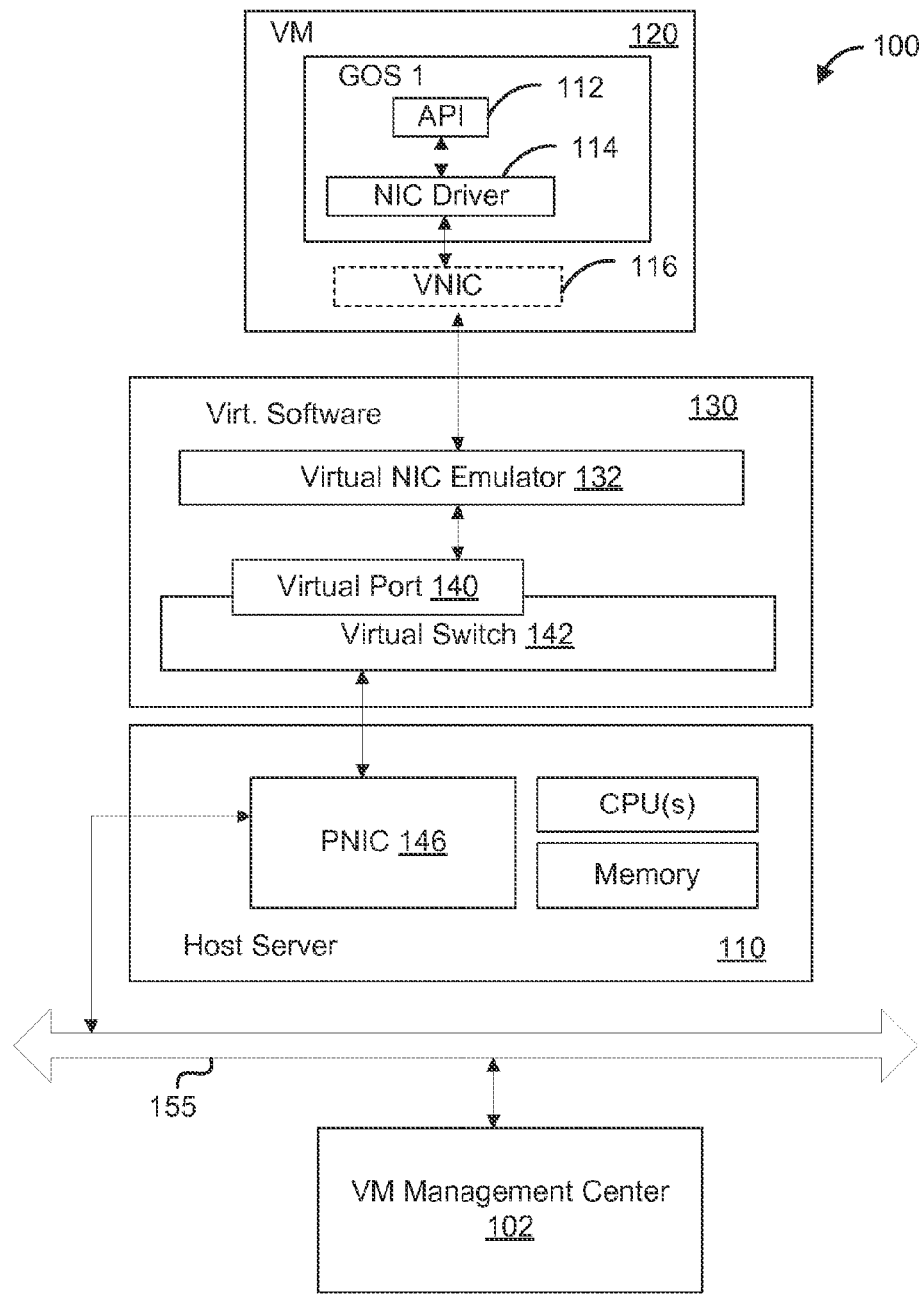
FIG. 1 illustrates components of a system in which an embodiment may be implemented.

FIG. 1 illustrates components of a system 100 in which an embodiment may be implemented. As shown, the system 100 is a virtualized environment that includes a host computer 110 in communication with a virtual machine (VM) management center 102. Host computer 110 is configured to deliver virtualization-based distributed services to information technology environments. Host computer 110 may be constructed on conventional, typically server-class, hardware platforms that include one or more central processing units (e.g., CPUs), memory, and physical network interface controllers (e.g., PNIC 146). Although a single host computer 110 is depicted, it should be understood that a virtualized environment may generally include any number of host computers.

Host computer 110 provides a virtualization layer (e.g., hypervisor 130) that abstracts processor, memory, storage, and/or networking resources into multiple virtual machines (e.g., VM 120) that run side-by-side on the same physical host computer 110. That is, the virtualization software partitions physical host computer 110 into multiple secure and portable virtual machines that run on the same physical servers. Each virtual machine represents a complete system—with processors, memory, networking, storage, and/or BIOS. In one embodiment, virtualization software can be installed directly on the server hardware and inserts a virtualization layer between the hardware and the operating system. Alternatively, the virtualization software may run on top of a conventional operating system in the server.

Each VM includes a software-based virtual network adapter (e.g., VNIC 116) that is logically connected to a physical network adapter (e.g., PNIC 146) included in host computer 110 that provides network access for the virtual machine. The VNIC is typically connected to the PNIC through a software-based "switch," such as virtual switch 142. RSS may be enabled on PNIC 146 such that when PNIC 146 receives incoming network traffic, PNIC 146 computes a hash value using the header attributes (e.g., destination port, source port, protocol, and the like) of each packet and forwards the packet to appropriate PNIC RSS queues by, e.g., indexing an indirection table using the computed hash value. In this manner, packets belonging to the same connection are distributed to the same PNIC RSS queue, based on the computed hash value. Separate CPUs may process each of the PNIC RSS queues, providing parallelization. Techniques for providing a VM and network queue management system that manages multiple queues that process traffic to and from multiple virtual machines (VMs) executing on a host are disclosed in U.S. patent application Ser. No. 14/530,587, filed on Oct. 31, 2014, and entitled NUMA I/O AWARE NETWORK QUEUE ASSIGNMENTS, which is incorporated by reference herein in its entirety.

In one embodiment, PNIC 146 not only computes RSS hash values using header attributes of received packets, but also writes the computed hash values to the packets themselves. VNIC 116 then reads the hash values from the packets and forwards the packets to VNIC RSS queues based on the hash values. If the number of PNIC RSS queues and VNIC RSS queues are identical, VNIC 116 may simply map packets from PNIC RSS queues to VNIC RSS queues using the PNIC RSS queue ID numbers. In another embodiment, each VNIC RSS queue has a respective lock that can be separately acquired to access the queue, and the packet list from a PNIC RSS queue is split into multiple packet lists that are separately delivered (e.g., in parallel) to respective VNICs.

Figure 2:
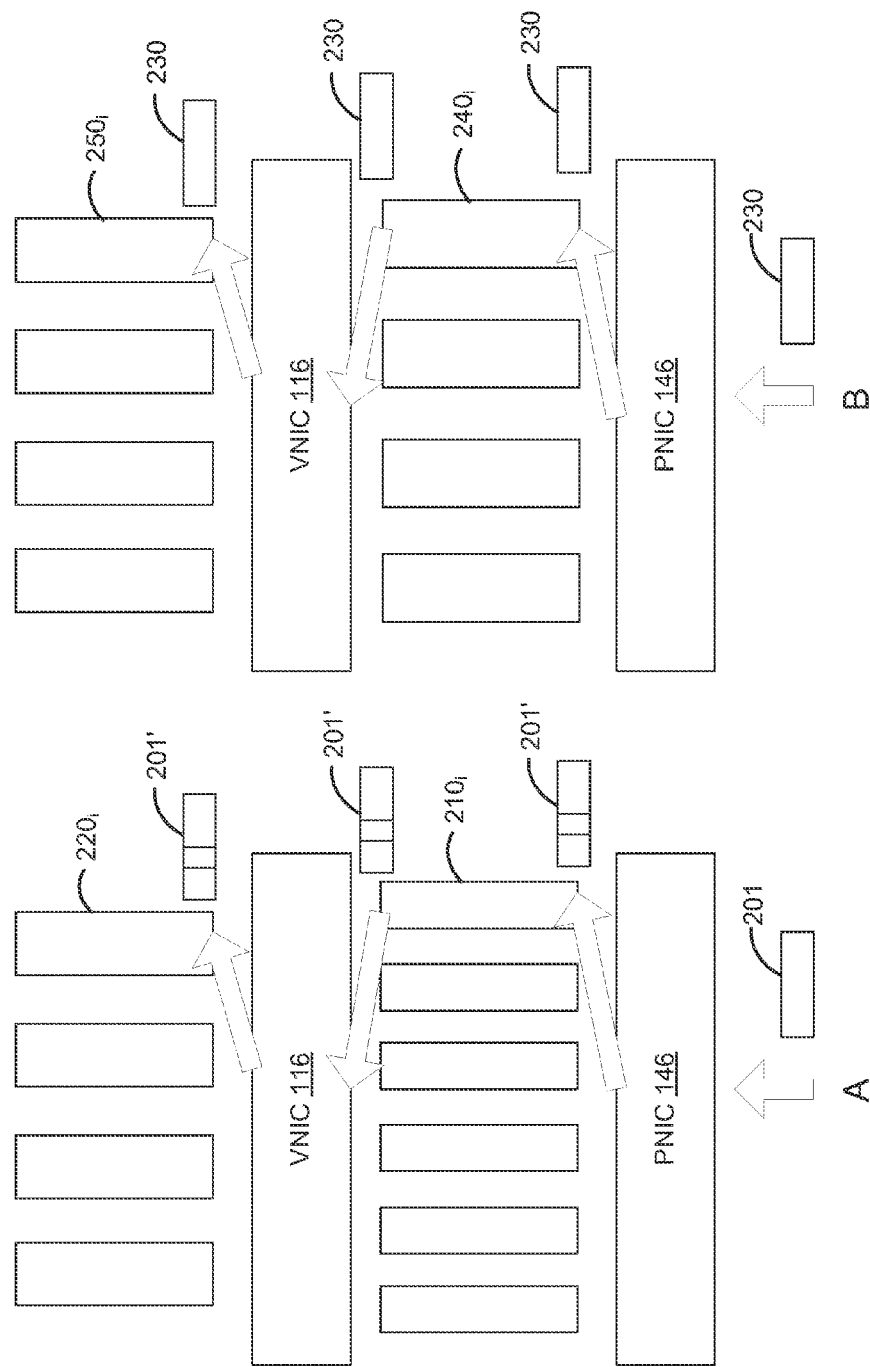
FIG. 2 illustrates an approach using PNIC RRS offloads to improve the performance of a VNIC, according to an embodiment.

FIG. 2 illustrates an approach for using PNIC RSS hash values to forward packets to VNIC RSS queues, according to an embodiment. Panel A depicts an embodiment in which the number of PNIC RSS queues $210_i$ is different from the number of VNIC RSS queues $220_i$. As shown, a received packet 201 is first processed by PNIC 146. Assuming RSS is enabled, PNIC 146 performs a hardware hash computation and stores the computed hash value in the packet 201 itself. For example, the computed hash value may be stored in metadata of the packet's 201 header. PNIC 146 then performs a direct memory access (DMA) to write packet 201' with the hash value stored therein to a buffer in memory associated with a PNIC RSS queue $210_i$ to which the hash value maps. As discussed, PNIC 146 may use the computed hash value to index an indirection table and DMA write packet 201' to the memory buffer for the PNIC RSS queue $210_i$ indicated by the corresponding indirection table value.

VNIC 116 then pulls the packets stored in the PNIC RSS queue $210_i$ and forwards those packets using the hash values stored therein. In one embodiment, a hypervisor thread may be created for each of the PNIC RSS queues 210, and such a thread is responsible for reading the packets from PNIC RISS queue $210_i$ and writing the packets to VNIC RSS queues 220 using the stored hash values. Similar to the discussion above with respect to PNIC RSS queue $210_i$, the hypervisor thread may use the hash value to index an indirection table and copy the packet 201' to a memory buffer for VNIC RSS queue $220_i$ indicated by the corresponding indirection table value. Reusing the hash value stored in the packet 201' eliminates the overhead of VNIC 116 having to compute an RSS hash value. It should be understood, however, that this assumes the VNIC is not configured to use a specific RSS hashing algorithm (which may be different than the one used by the PNIC), in which case the VNIC may compute its own hash values rather than reusing the hash values computed by the PNIC.

Panel B depicts an embodiment in which the number of PNIC RSS queues $240_i$ is the same as the number of VNIC RSS queues $250_i$. For example, the number of PNIC RSS $240_i$ queues may be known, and if the number of VNIC RSS queues $250_i$, as determined by the number of virtual CPUS (VCPUs) corresponding thereto that the hypervisor schedules for execution, is the same, then direct mapping of PNIC RSS queues $240_i$ to VNIC RSS queues $250_i$ may be applied. In such a case, when a packet 230 arrives, PNIC 146 performs a hardware hash computation and performs a direct memory access (DMA) to write packet 230 to a memory buffer associated with a PNIC RSS queue $240_i$ to which the computed hash value maps, similar to when the number of PNIC RSS queues 240 is different from the number of VNIC RSS queues 250. However, PNIC 146 need not store the computed hash value in packet 230 and may, e.g., insert a "null" value instead or not store any value.

When VNIC 116 pulls a packet stored in the PNIC RSS queue $240_i$, VNIC 116 forwards the packet to VNIC RSS queues $250_i$ using the queue ID of the PNIC queue $240_i$ from which the packet was pulled. For example, the VNIC may forward the packet to the VNIC RSS queue having the same ID as that of the PNIC queue from which the packet was received. Separate hypervisor threads may be responsible for delivering packets from each of the PNIC RSS queues 240, and the thread that is working on a particular PNIC RSS queue $240_i$ may copy packets in the queue to a corresponding VNIC RSS queue $250_i$ to which PNIC RSS queue $230_i$ maps. Doing so eliminates the overhead of VNIC 116 having to compute RSS hash values. In a particular embodiment, packets from a PNIC RSS queue $240_i$ may be delivered to VNIC RSS queue $250_i$ having the same queue ID. For example, packets from PNIC RSS queue ID 0 may be delivered to VNIC RSS queue ID 0.

Figure 3:
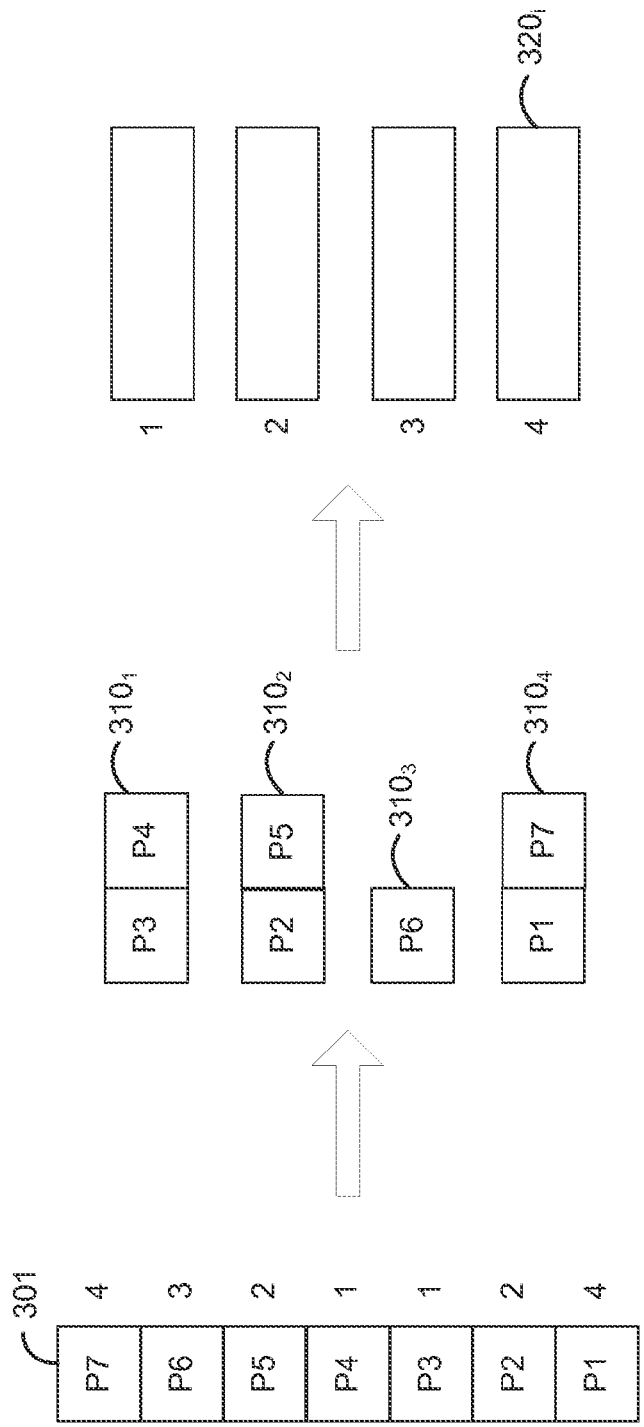
FIG. 3 illustrates an approach for splitting a packet list, according to an embodiment.

FIG. 3 illustrates an approach for splitting a packet list, according to an embodiment. As shown, a packet list 301 of a PNIC RSS queue $240_i$ includes seven packets P1-P7. When processing packets from the physical NIC, a list of packets are processed at a time, rather than a single packet at a time. Processing such a packet list includes iterating over packets in the list, sorting the packets using computed RSS hashes, writing the hash values to the packets themselves, and placing each packet in a per-PNIC RSS queue packet list based on the corresponding RSS hash value. As discussed, a hypervisor thread for each PNIC RSS queue $240_i$ then delivers the packets in that PNIC RSS queue $240_i$ to the appropriate VNIC RSS queues 320 using the hash value computed and stored in the packets. It should be understood that this assumes the number of VNIC RSS queues is different from the number of PNIC RSS queues. If the number of VNIC RSS queues is the same as the number of PNIC RSS queues, then queue IDs rather than hash values may be used to deliver the packets.

In one embodiment, each of VNIC RSS queues 320 has a respective lock that is acquired by hypervisor threads to access the queue and released after packet(s) have been copied to the queue. The locks are used to prevent multiple threads from mapping packets to the same buffer simultaneously. This is in contrast to traditional techniques, in which a single lock is used for multiple VNIC RSS queues. By instead breaking such a lock into per-VNIC RSS queue locks, packets may be delivered to the VNIC RSS queues in parallel. For such parallelism, packet list 301 is also split into multiple packet lists 310, one for each VNIC RSS queue $320_i$. Illustratively, packets P1-P7 are to be delivered to VNIC RSS queues 4, 2, 1, 1, 2, 3, and 4, respectively. However, the packets are out of order in that they need to be delivered to different VNIC RSS queues in an essentially random order, rather than delivering all packets for a single VNIC RSS queue to that queue and then delivering packets for a next VNIC RSS queue to the next queue, etc. To remedy this problem, the hypervisor thread first splits packet list 301 into a first packet list $310_1$ for VNIC RSS queue 1 which includes packets P3 and P4, a second packet list $310_2$ for VNIC RSS queue 2 which includes packets P2 and P5, a third packet list $310_3$ for VNIC RSS queue 3 which includes packet P6, and a fourth packet list $310_4$ for VNIC RSS queue 4 which includes packets P1 and P7. The locks for each of VNIC RSS queues 320 are then acquired separately (e.g., by different hypervisor threads), and the packets in the corresponding packet lists 310 are copied to VNIC RSS queues 320.

In one embodiment, packet list 301 may further be cloned prior to splitting packet list 301. Such cloning is required so that a packet list that needs to be distributed to multiple VNICs, each of which has its own RSS queues, may be properly delivered to those VNIC RSS queues. It should be understood that the packet list may be distributed differently to each VNIC in such a case, so packet list 301 should not be split in a manner suitable for only one of the VNICs without first cloning packet list 301.

Figure 4:
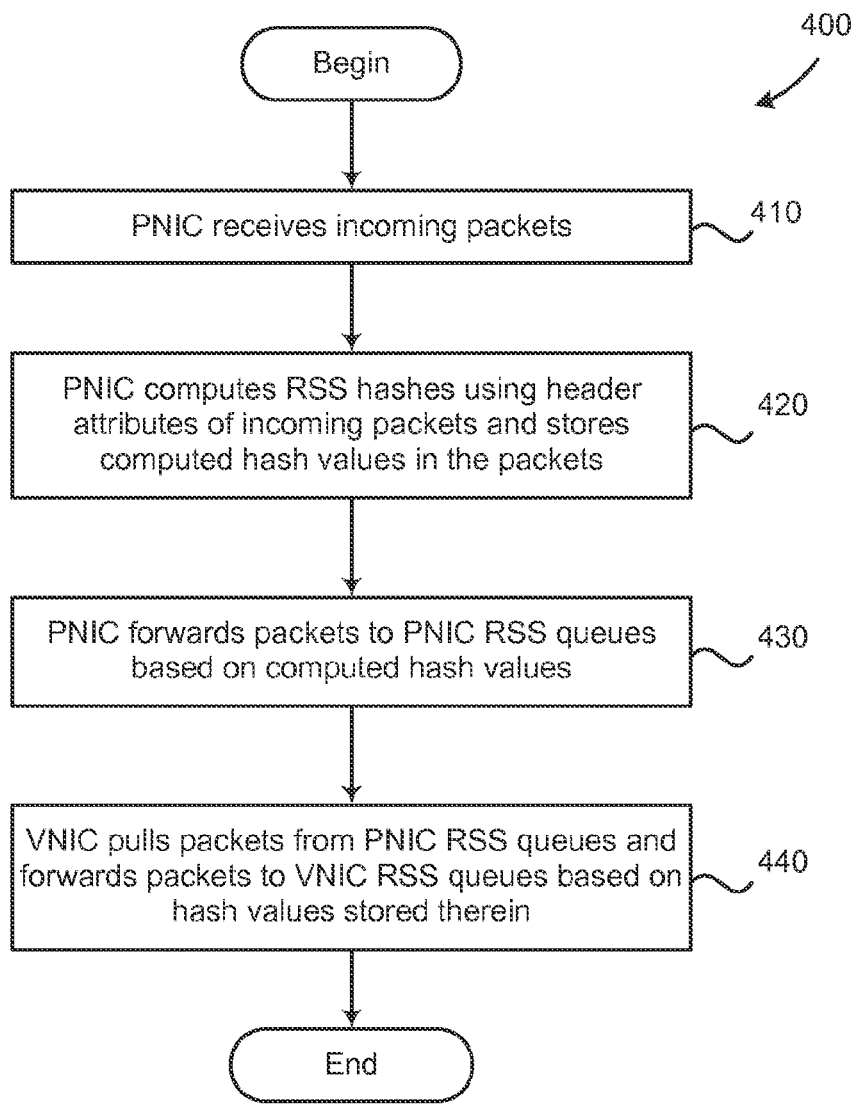
FIG. 4 illustrates a method for using PNIC RSS hash values to forward packets to VNIC RSS queues, according to an embodiment.

FIG. 4 illustrates a method 400 for using PNIC RSS hash values to forward packets to VNIC RSS queues, according to an embodiment. As shown, method 400 begins at step 410, where PNIC 146 receives incoming packets. At step 420, PNIC 146 computes RSS hashes using header attributes (e.g., destination port, source port, protocol, and the like) of the incoming packets and stores the computed hash values in the packets. Any feasible hash algorithm may be used to compute the hash values, which may be stored as metadata in the packet headers in one embodiment.

At step 430, PNIC 146 forwards the packets to PNIC RSS queues 210 based on the computed hash values. In one embodiment, PNIC 146 may use the computed hash values to index an indirection table and DMA write a packet to a memory buffer for the PNIC RSS queue $210_i$ indicated by the corresponding indirection table value.

At step 440, VNIC 116 pulls packets from PNIC RSS queues 210 and forwards the packets to VNIC RSS queues 220 based on the hash values stored therein. Similar to forwarding packets to PNIC RSS queues 210, the stored hash values may be used to index an indirection table, and the corresponding indirection table values may then indicate which VNIC RSS queues 220 to copy the packets to. In one embodiment, a hypervisor thread may be created for each of the PNIC RSS queues 210, and the hypervisor thread is responsible for mapping the hash values stored in packets to VNIC RSS queues 220 and copying the packets to the appropriate VNIC RSS queues 220.

In another embodiment, each VNIC RSS queue $220_i$ has its own lock that may be acquired to write to the queue and released thereafter. In such a case, a packet list from one of the PNIC RSS queues 210 may also be cloned and the cloned list split into multiple queues with packets to be delivered to respective VNIC RSS queues 220, thereby providing parallelism.

Figure 5:
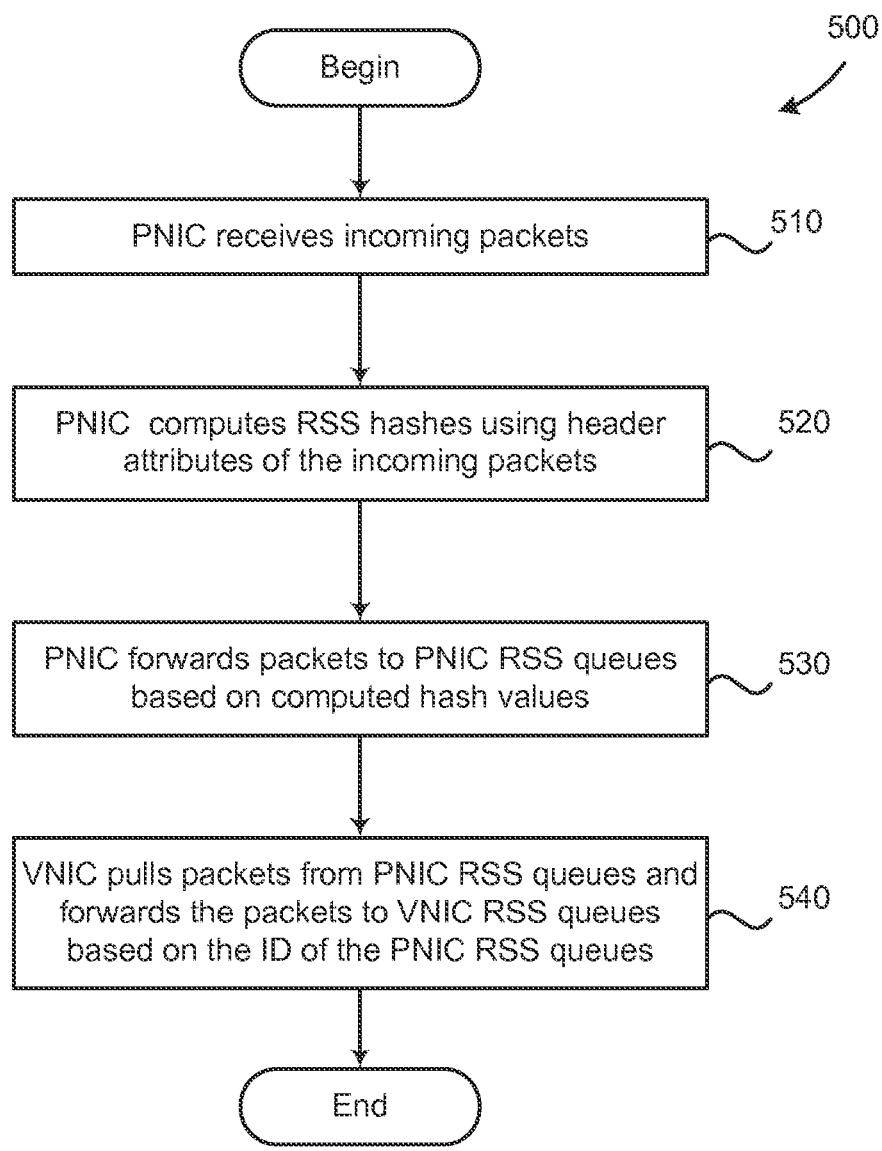
FIG. 5 illustrates a method for using PNIC RSS queue IDs to forward packets to VNIC RSS queues, according to an embodiment.

FIG. 5 illustrates a method 500 for using PNIC RSS queue IDs to forward packets to VNIC RSS queues, according to an embodiment. This method assumes that the number of PNIC RSS queues is the same as the number of VNIC RSS queues. As shown, method 500 begins at step 510, where PNIC 146 receives incoming packets. At step 520, PNIC 146 computes RSS hashes using header attributes of the incoming packets, similar to step 420 of method 400, discussed above. However, as the number of PNIC RSS queues 240 is the same as the number of VNIC RSS queues 250, PNIC 146 need not store the computed hash value in the packet itself and may, e.g., insert a "null" value instead or not store any value.

At step 530, PNIC 146 forwards the packets to PNIC queues 240 based on the computed hash values. As discussed, PNIC 146 may use the computed hash value to index an indirection table and DMA write a packet to a memory buffer for the PNIC RSS queue $240_i$ indicated by the corresponding indirection table value.

At step 540, VNIC 116 pulls packets from PNIC RSS queues 240 and forwards the packets to VNIC RSS queues 250 based on the IDs of the PNIC RSS queues. In one embodiment, a hypervisor thread may be created for each of the PNIC RSS queues 240, and the hypervisor thread for a PNIC RSS queue $240_i$ having a given ID number may forward the packets from such a queue to a VNIC RSS queue having the same ID number.

Advantageously, techniques disclosed herein permit packets from PNIC RSS queues to be delivered to VNIC RSS queues using RSS hash values computed by the PNIC and stored in the packets themselves. The VNIC is no longer required to computes RSS hash values, which reduces CPU overhead. Where the number of PNIC RSS queues is identical to the number of VNIC RSS queues, packets may be forwarded from PNIC RSS queues to VNIC RSS queues based on the queue ID of the PNIC RSS queues, which also does not require the VNIC to compute RSS hash values. Additional efficiency may be achieved by splitting a packet list from a PNIC RSS queue into multiple packet lists that are separately delivered to respective VNICs having their own locks.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of delivering packets received from one or more physical networks by a physical network interface controller (PNIC) of a host from a plurality of queues of the (PNIC) to a plurality of queues of a virtual network interface controller (VNIC) of a virtual computing instance running on the host, the host providing a virtualization layer that abstracts hardware resources of the host into multiple virtual computing instances including the virtual computing instance, the virtual computing instance comprising a plurality of virtual processors corresponding to resources of hardware resources of the host, the VNIC running on the host and being separate from the PNIC comprising:
    queuing received packets using the PNIC queues based on hash values computed by the PNIC from header attributes of the received packets, wherein each of the PNIC queues is associated with one of a plurality of physical processors of the host;
    storing the hash value computed by the PNIC for each received packet in the queued packet itself when the number of PNIC queues is different from the number of VNIC queues; and
    forwarding the queued packets to the VNIC queues based on the hash values computed by the PNIC when the number of PNIC queues is different from the number of VNIC queues, otherwise forwarding the queued packets to the VNIC queues based on identifiers (IDs) associated with the PNIC queues if the number of PNIC queues is the same as the number of VNIC queues, wherein each of the VNIC queues is associated with one of a the plurality of virtual processors of the virtual computing instance.

2. The method of claim 1, further comprising, storing the hash value computed by the PNIC for each received packet in the queued packet itself, wherein the queued packets are forwarded to the VNIC queues based on the hash values stored therein.

3. The method of claim 1, further comprising, for each of the PNIC queues, splitting a packet list from the PNIC queue into multiple packet lists corresponding to each of the VNIC queues.

4. The method of claim 3, further comprising, cloning the packet list from the PNIC queue, wherein the cloned packet list is split into the multiple packet lists.

5. The method of claim 3, wherein each of the VNIC queues is associated with a respective lock that is acquired to write to the VNIC queue.

6. The method of claim 1, wherein queued packets from the PNIC queues are forwarded to the VNIC queues associated with the same queue IDs as the PNIC queues.

7. The method of claim 1, wherein a distinct hypervisor thread forwards queued packets stored in each of the PNIC queues to the VNIC queues.

8. A non-transitory computer-readable storage medium containing a program which, when executed by one or more of a plurality of physical processors of a host, performs operations for delivering packets received from one or more physical networks by a physical network interface controller (PNIC) of a host from a plurality of queues of the (PNIC)
   to a plurality of queues of a virtual network interface controller (VNIC) of a virtual computing instance running on the host the host providing a virtualization layer that abstracts hardware resources of the host into multiple virtual computing instances including the virtual computing instance, the virtual computing instance comprising a plurality of virtual processors corresponding to resources of hardware resources of the host, the VNIC running on the host and being separate from the PNIC, the operations comprising:
   queuing received packets using the PNIC queues based on hash values computed by the PNIC from header attributes of the received packets, wherein each of the PNIC queues is associated with one of a plurality of physical processors of the host;
   storing the hash value computed by the PNIC for each received packet in the queued packet itself when the number of PNIC queues is different from the number of VNIC queues; and
   forwarding the queued packets to the VNIC queues based on the hash values computed by the PNIC when the number of PNIC queues is different from the number of VNIC queues, otherwise forwarding the queued packets to the VNIC queues based on identifiers (IDs) associated with the PNIC queues if the number of PNIC queues is the same as the number of VNIC queues, wherein each of the VNIC queues is associated with one of a the plurality of virtual processors of the virtual computing instance.

9. The computer-readable storage medium of claim 8, the operations further comprising, for each of the PNIC queues, splitting a packet list from the PNIC queue into multiple packet lists corresponding to each of the VNIC queues.

10. The computer-readable storage medium of claim 9, the operations further comprising, cloning the packet list from the PNIC queue, wherein the cloned packet list is split into the multiple packet lists.

11. The computer-readable storage medium of claim 9, wherein each of the VNIC queues is associated with a respective lock that is acquired to write to the VNIC queue.

12. The computer-readable storage medium of claim 8, the operations further comprising, storing the hash value computed by the PNIC for each received packet in the queued packet itself, wherein the queued packets are forwarded to the VNIC queues based on the hash values stored therein.

13. The computer-readable storage medium of claim 8, wherein queued packets from the PNIC queues are forwarded to the VNIC queues associated with the same queue IDs as the PNIC queues.

14. The computer-readable storage medium of claim 8, wherein a distinct hypervisor thread forwards queued packets stored in each of the PNIC queues to the VNIC queues.

15. A system, comprising:
   a plurality of physical processors; and
   a memory, wherein the memory includes a program executable in at least one of the plurality of physical processors to perform operations for delivering packets received from one or more physical networks by a physical network interface controller (PNIC) of the system from a plurality of queues of the (PNIC) to a plurality of queues of a virtual network interface controller (VNIC) of a virtual computing instance running on the system, the system providing a virtualization layer that abstracts hardware resources of the system into multiple virtual computing instances including the virtual computing instance, the virtual computing instance comprising a plurality of virtual processors corresponding to resources of hardware resources of the system, the VNIC running on the system and being separate from the PNIC, the operations comprising:
   queuing received packets using the PNIC queues based on hash values computed by the PNIC from header attributes of the received packets, wherein each of the PNIC queues is associated with one of the plurality of physical processors;
   storing the hash value computed by the PNIC for each received packet in the queued packet itself when the number of PNIC queues is different from the number of VNIC queues; and
   forwarding the queued packets to the VNIC queues based on the hash values computed by the PNIC when the number of PNIC queues is different from the number of VNIC queues, otherwise forwarding the queued packets to the VNIC queues based on identifiers (IDs) associated with the PNIC queues if the number of PNIC queues is the same as the number of VNIC queues, wherein each of the VNIC queues is associated with one of a the plurality of virtual processors of the virtual computing instance.

16. The system of claim 15, the operations further comprising, storing the hash value computed by the PNIC for each received packet in the queued packet itself, wherein the queued packets are forwarded to the VNIC queues based on the hash values stored therein.

17. The system of claim 15, the operations further comprising, for each of the PNIC queues, splitting a packet list from the PNIC queue into multiple packet lists corresponding to each of the VNIC queues.

* * * * *